United States Patent [19]

Apple et al.

[11] Patent Number: 6,158,942
[45] Date of Patent: Dec. 12, 2000

[54] TAPE CARTRIDGE ACCESS PORT

[75] Inventors: James L. Apple, Boulder; Roger H. Grow, Lafayette, both of Colo.

[73] Assignee: Storage Technology Corporation, Louisville, Colo.

[21] Appl. No.: 09/324,222

[22] Filed: Jun. 2, 1999

[51] Int. Cl.$^7$ .................................................. B65G 1/137
[52] U.S. Cl. ............................. 414/273; 49/68; 414/277; 312/287
[58] Field of Search .................................. 414/273, 277; 49/68; 312/287

[56] References Cited

U.S. PATENT DOCUMENTS

| | | | |
|---|---|---|---|
| 4,481,887 | 11/1984 | Urbano | 49/68 X |
| 4,779,151 | 10/1988 | Lind et al. | |
| 5,247,406 | 9/1993 | Apple et al. | |
| 5,258,882 | 11/1993 | Apple et al. | |
| 5,278,708 | 1/1994 | Apple et al. | |
| 5,358,325 | 10/1994 | Teale | 312/287 |
| 5,429,470 | 7/1995 | Nicol et al. | |
| 5,498,116 | 3/1996 | Woodruff et al. | |
| 5,613,154 | 3/1997 | Burke et al. | 395/821 |
| 5,622,470 | 4/1997 | Schaefer et al. | |
| 5,700,125 | 12/1997 | Falace et al. | |
| 5,836,735 | 11/1998 | Yeakley et al. | |

*Primary Examiner*—Steven A. Bratile
*Attorney, Agent, or Firm*—Brooks & Kushman P.C.

[57] ABSTRACT

A tape cartridge access port includes frames defining a series of tape cartridge magazine cavities for directly loading magazines filled with tape cartridges with the labels on the front surfaces of the tape cartridges oriented towards the robotics of an automated cartridge library. The tape cartridge access port has safety doors which prevent access by an operator to the robotics of the automated cartridge library while allowing the magazines and the tape cartridges to be accessible to the operator when the robotics are in operation on other tape cartridges. The safety doors are triggered and released by a magazine loaded into the tape cartridge access port. The tape cartridge access port also has an outer door panel locked and unlocked by a library management unit of the automated cartridge library to prevent the operator and the robotics of the automated cartridge library from handling a magazine at the same time.

17 Claims, 6 Drawing Sheets

TAPE CARTRIDGE ACCESS PORT

TECHNICAL FIELD

The present invention relates generally to tape cartridge access ports for automated cartridge libraries and, more particularly, to a tape cartridge access port which directly loads magazines filled with tape cartridges with the labels the tape cartridges oriented toward the robotics of an automated cartridge library

BACKGROUND ART

A popular device for handling large amounts of information in a data processing system is an automated cartridge library. Automated cartridge libraries store and manage large numbers of standardized tape cartridges containing magnetic tape on which is recorded data. Typically, an automated cartridge library includes arrays of uniquely identified cells, each cell being formed to contain a tape cartridge. The cell arrays are effectively racks for holding a multitude of tape cartridges, each cell having some kind of identifying information, such as a bar code. A robotic arm having an optical system for selecting the correct cartridge is operable within the automated cartridge library to locate a particular cell, retrieve a tape cartridge from the particular cell, convey the tape cartridge to a tape drive, and insert the tape cartridge into the tape drive The tape drive is then operable to read or write data to the magnetic tape of the tape cartridge. In this way, a large number of tape cartridges are automatically accessible to a single tape transport mechanism. The operation of the automated cartridge library is typically controlled by a host computer working through a library control unit.

In some applications, such a large amount of data must be stored that it is desirable to employ more than one automated cartridge library in order to manage the large number of tape cartridges. Rather than repeating an entire automated cartridge library including all the necessary control units, the host computer, and the tape drive, it is desirable to link together multiple library storage modules. Each library storage module contains cell arrays and a robotic arm as described above but does not require additional host computers and need not contain a tape drive. Multiple library storage units are arranged adjacent one another and pass through ports are provided for passing tape cartridges from one library storage module to an adjacent library storage module. In this arrangement, the host computer can direct a library storage module not having a tape drive to pass a tape cartridge to an adjacent library storage module where it is picked up by the robotic arm of the adjacent library storage module and transported to and inserted in a tape drive of the adjacent library storage module.

A critical component in the use of an automated cartridge library is a tape cartridge access port. A tape cartridge access port is a port for tape cartridges to pass between the automated cartridge library and the outside environment. A tape cartridge access port, which is mounted on an automated cartridge library, loads tape cartridges into and retrieves tape cartridges from the automated cartridge library. Typically, tape cartridges are loaded onto a magazine and then the magazine is inserted through the tape cartridge access port. The tape cartridges are loaded onto the magazine with their front surfaces oriented toward the operator. The front surfaces of the tape cartridges contain information label such as bar codes. The cartridge access port then rotates the magazine, and thus the tape cartridges, so that the information labels face the interior of the automated cartridge library. Consequently, the tape cartridges can be accessed by the robotics of the automated cartridge library.

A problem with rotating or repositioning the magazine and the tape cartridges for presentation to the robotics of the automated cartridge library is that this creates unnecessary complexity. Further, a problem with typical tape cartridge access ports that are capable of loading multiple tape cartridges at a time in an automated cartridge library is that an operator may insert a body appendage instead of a tape cartridge magazine into the automated cartridge library and possibly damage the robotics inside the automated cartridge library.

SUMMARY OF THE INVENTION

Accordingly, it is an object of the present invention to provide a tape cartridge access port which directly loads magazines filled with tape cartridges with the labels on the front surfaces of the tape cartridges oriented towards the robotics of an automated cartridge library.

It is another object of the present invention to provide a tape cartridge access port which does not rotate magazines filled with tape cartridges when loading the magazines into an automated cartridge library.

It is a further object of the present invention to provide a tape cartridge access port which loads multiple magazines filled with tape cartridges simultaneously into an automated cartridge library.

It is still another object of the present invention to provide a tape cartridge access port having safety doors which prevent access by an operator to the robotics of an automated cartridge library while allowing the magazines and the tape cartridges to be accessible to the operator when the robotics are in operation on other tape cartridges.

It is still a further object of the present invention to provide a tape cartridge access port having safety doors which are triggered and released by a magazine being loaded into an automated cartridge library.

It is still yet another object of the present invention to provide a tape cartridge access port having an outer door panel locked and unlocked by a library management unit of an automated cartridge library to prevent the operator and the robotics of the automated cartridge library from handling a magazine at the same time.

In carrying out the above objects and other objects, the present invention provides a tape cartridge access port for loading and unloading a magazine filled with at least one tape cartridge into and from an automated cartridge library having robotics for handling the at least one tape cartridge. The at least one tape cartridge has a front surface with an information label.

The tape cartridge access port includes an enclosure panel attachable to an automated cartridge library. The enclosure panel has an exterior side exterior to the automated cartridge library and an interior side internal to the automated cartridge library. An opening is formed in the enclosure panel for enabling a magazine to pass between the exterior and interior sides of the enclosure panel. A frame is attached to the interior side of the enclosure panel for holding a magazine filled with at least one tape cartridge such that the information label of the at least one tape cartridge is oriented towards the robotics of the automated cartridge library. The frame is positioned around a part of the opening to load and unload a magazine through the opening. A hinged pair of safety doors is associated with the frame. The hinged pair of safety doors are operable to open when a magazine is inserted through the opening to load the magazine into the frame while preventing access of an operator to the robotics of the automated cartridge library. The hinged pair of safety doors are also operable to close when a magazine is unloaded through the opening from the frame to prevent access of the operator to the robotics of the automated cartridge library.

Preferably, the tape cartridge access port further includes a door panel, a lock, and a processor. The door panel is attached to the exterior side of the enclosure panel. The door panel is movable between a closed position in which access to the opening by the operator is prevented and an opened position in which access to the opening by the operator is allowed. The processor controls the lock to lock the door panel in the closed position to prevent the operator and the robotics from simultaneously handling a magazine held by the frame. Preferably, the tape cartridge access port further includes a door panel sensor for providing a closed door panel sensor signal indicative of the door panel being in the closed position to the processor. Upon receiving the closed door panel sensor signal the processor allows the robotics to handle a magazine held by the frame. The door panel sensor also provides an opened door panel sensor signal indicative of the door panel being in the opened position to the processor. Upon receiving the opened door panel sensor signal the processor prevents the robotics from handling a magazine held by the frame.

Preferably, the tape cartridge access port further includes a frame sensor for providing a frame signal indicative of a magazine being held by the frame. The processor is operable with the frame sensor signal for receiving the frame signal and upon receiving the frame sensor signal allows the robotics to handle the magazine held by the frame.

The advantages accruing to the present invention are numerous. For instance, the tape cartridge access port does not rotate or reposition the magazines and the tape cartridges when presenting them to the robotics of the automated cartridge library. The tape cartridge access port loads and unloads magazines filled with tape cartridges into an automated cartridge library instead of loading and unloading a single tape cartridge at a time and handles multiple magazines at a time. The tape cartridge access port includes safety doors which are triggered and released open by a magazine thereby preventing an operator from reaching into the automated cartridge library and causing damage to the robotics therein. The tape cartridge access port includes an outer door panel controlled by a library management unit which locks the door panel shut when the robotics are handling a magazine to prevent an operator from accessing the same magazine.

The above objects and other objects, features, and advantages embodiments of the present invention are readily apparent from the following detailed description of the best mode for carrying out the present invention when taken in connection with the accompanying drawings.

BEST MODES FOR CARRYING OUT THE INVENTION

Figure 1:
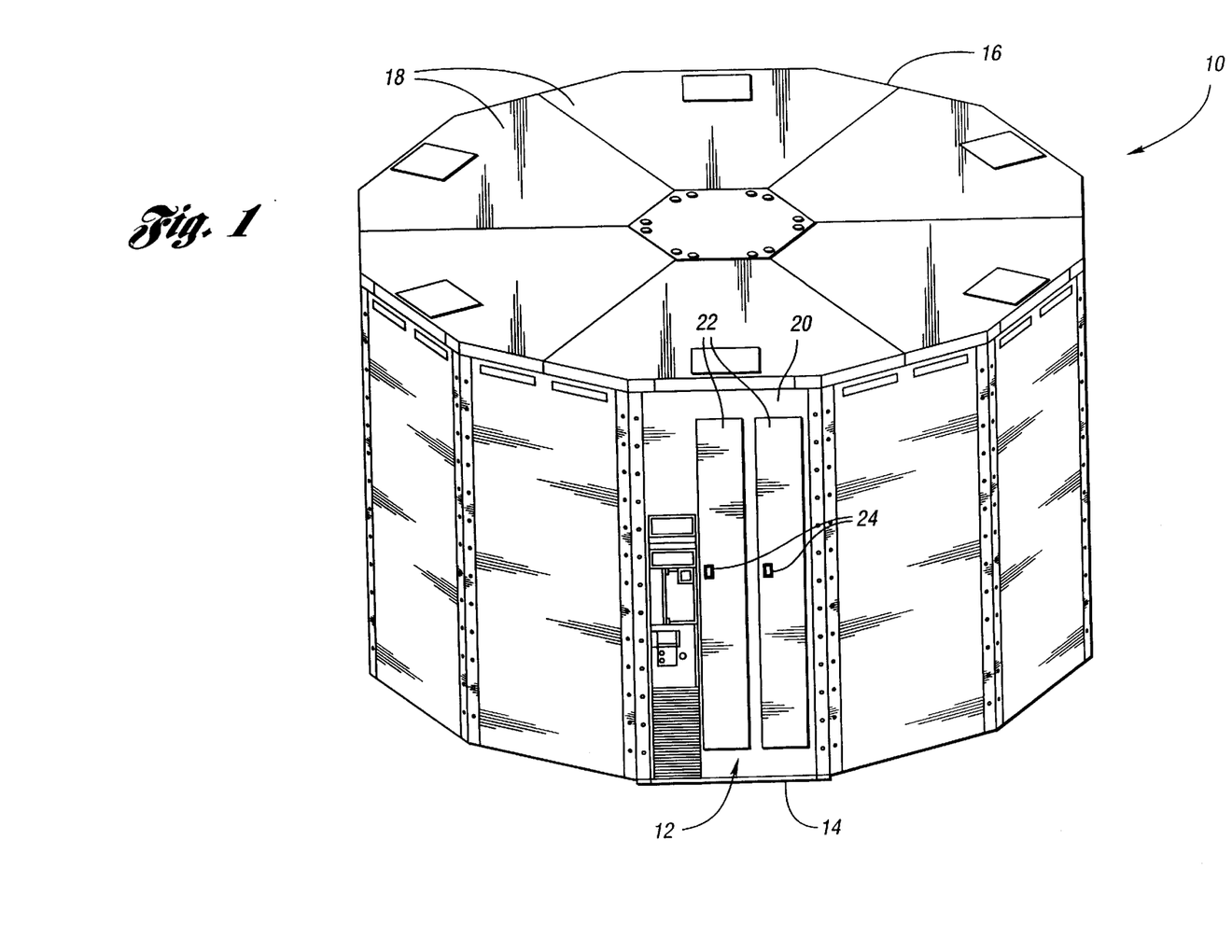
FIG. 1 illustrates an automated cartridge library having a tape cartridge access port in accordance with the present invention.

Referring now to FIG. 1, an automated cartridge library 10 having a tape cartridge access port 12 in accordance with the present invention is shown. Tape cartridge access port 12 is attached to an external surface 14 of automated cartridge library 10. Tape cartridge access port 12 provides access for magazines having tape cartridges to pass between the internal side of automated cartridge library 10 and the external environment of the automated cartridge library. Automated cartridge library 10 includes a library storage module 16 having a plurality of cell arrays 18 for storing tape cartridges.

Tape cartridge access port 12 includes an enclosure panel 20 having two door panels 22. Each of door panels 22 include a lock 24 associated therewith for locking the door panels to enclosure panel 20 in a closed position. In the closed position, door panels 22 prevent access between the internal side of automated cartridge library 10 and the external environment. Locks 24 unlock to enable door panels 22 to move to an opened position. In the opened position, door panels 22 are moved away from enclosure panel 20 to allow access to the internal side of automated cartridge library 10.

Figure 2:
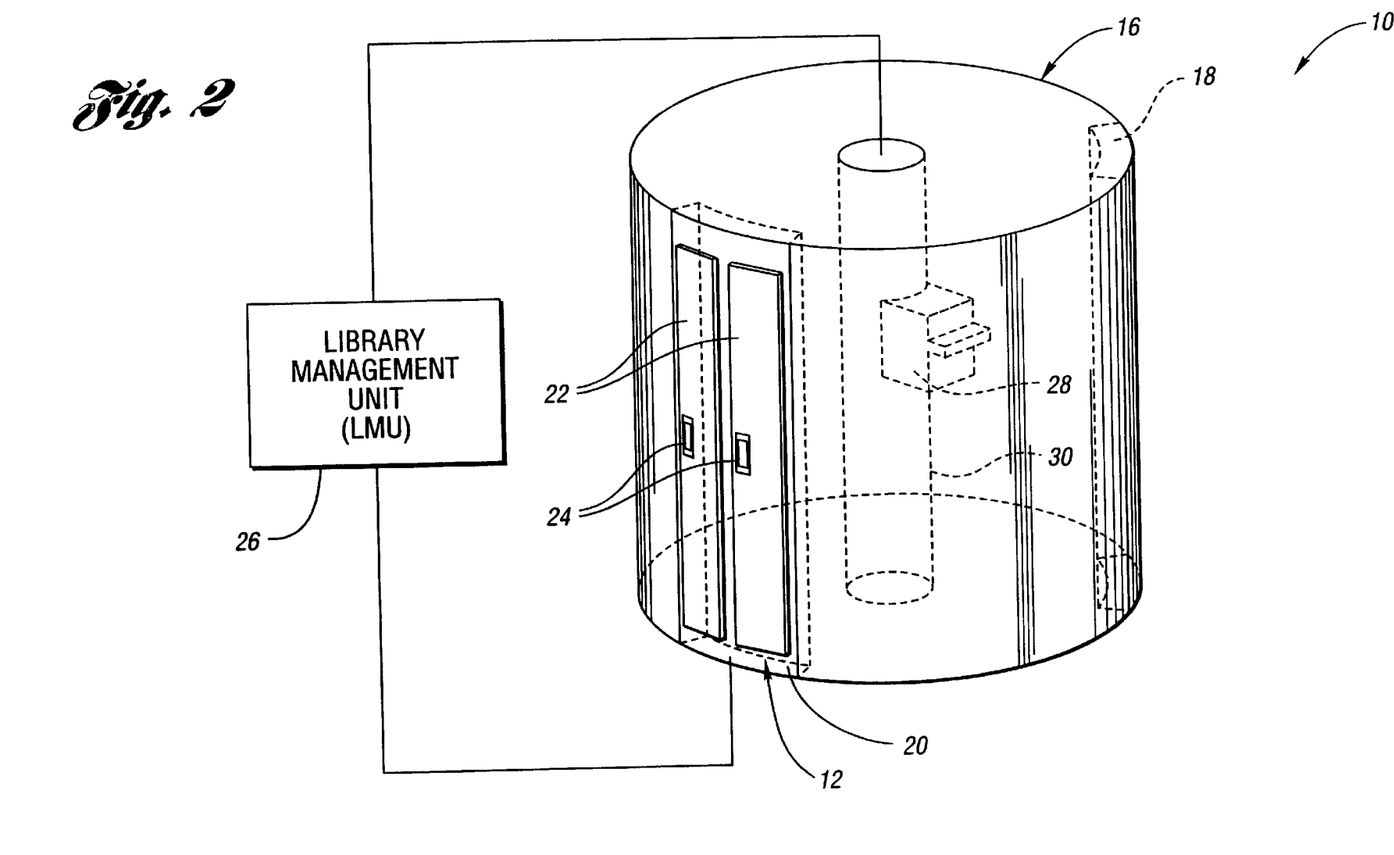
FIG. 2 illustrates a library management unit and robotics associated with the automated cartridge library and the tape cartridge access port.

Referring now to FIG. 2, automated cartridge library 10 further includes a library management unit (LMU) 26. LMU 26 is operable with tape cartridge access port 12 to monitor and control the tape cartridge access port. LMU 26 is operable to determine when door panels 22 are in the closed position and locked. LMU 26 is also operable to determine when door panels 22 are in the opened position and unlocked.

Automated cartridge library 10 further includes robotics 28 located internally. Robotics 28 function to move tape cartridges from one location in automated cartridge library 10 to another location. Robotics 28 includes a gripper for gripping tape cartridges. Robotics 28 swivel around and up and down along an axis post 30 to move tape cartridges between cells in cell arrays of library storage module 16.

Figure 3A:
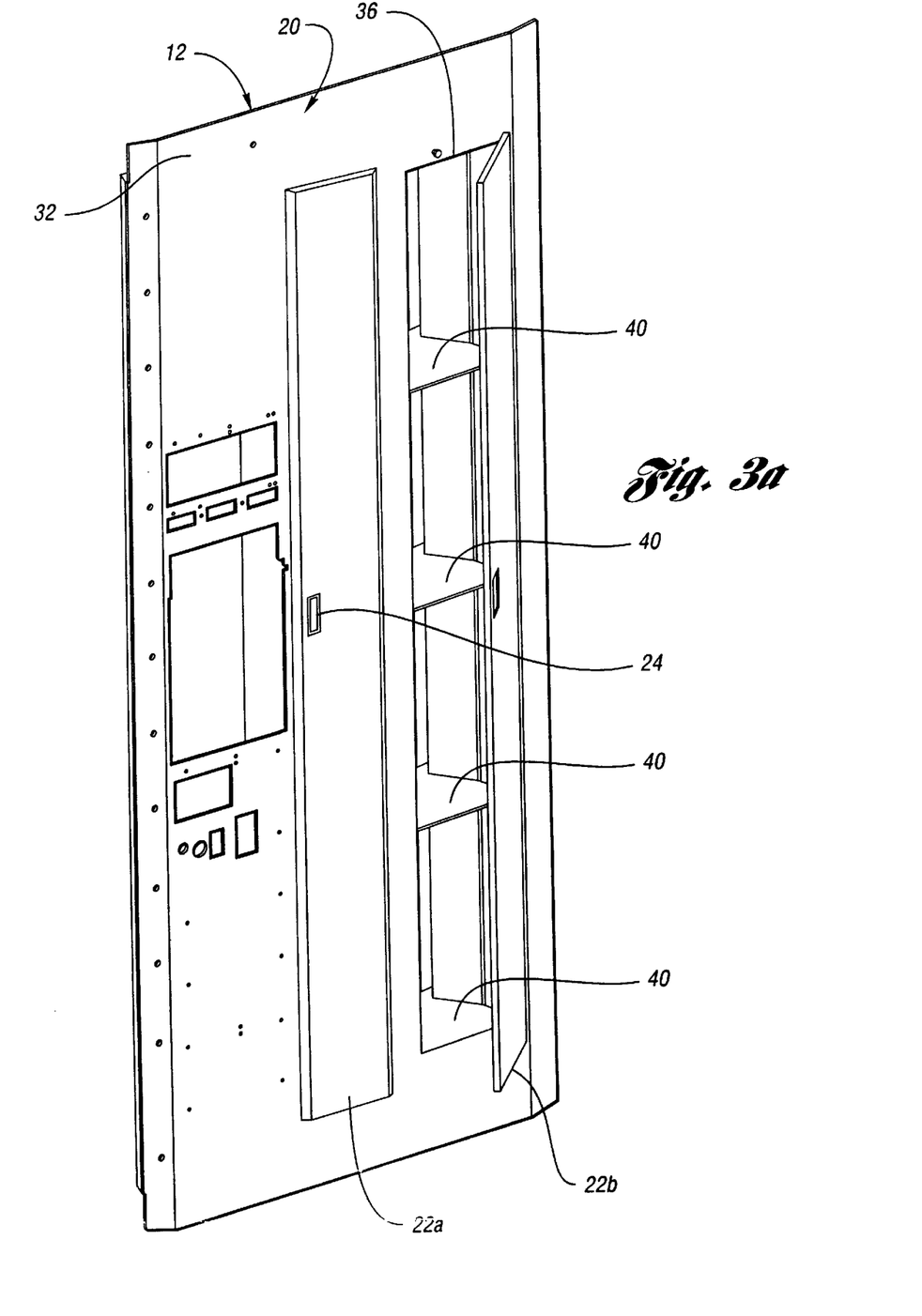
FIG. 3A illustrates a frontal perspective view of the tape cartridge access port.
Figure 3B:
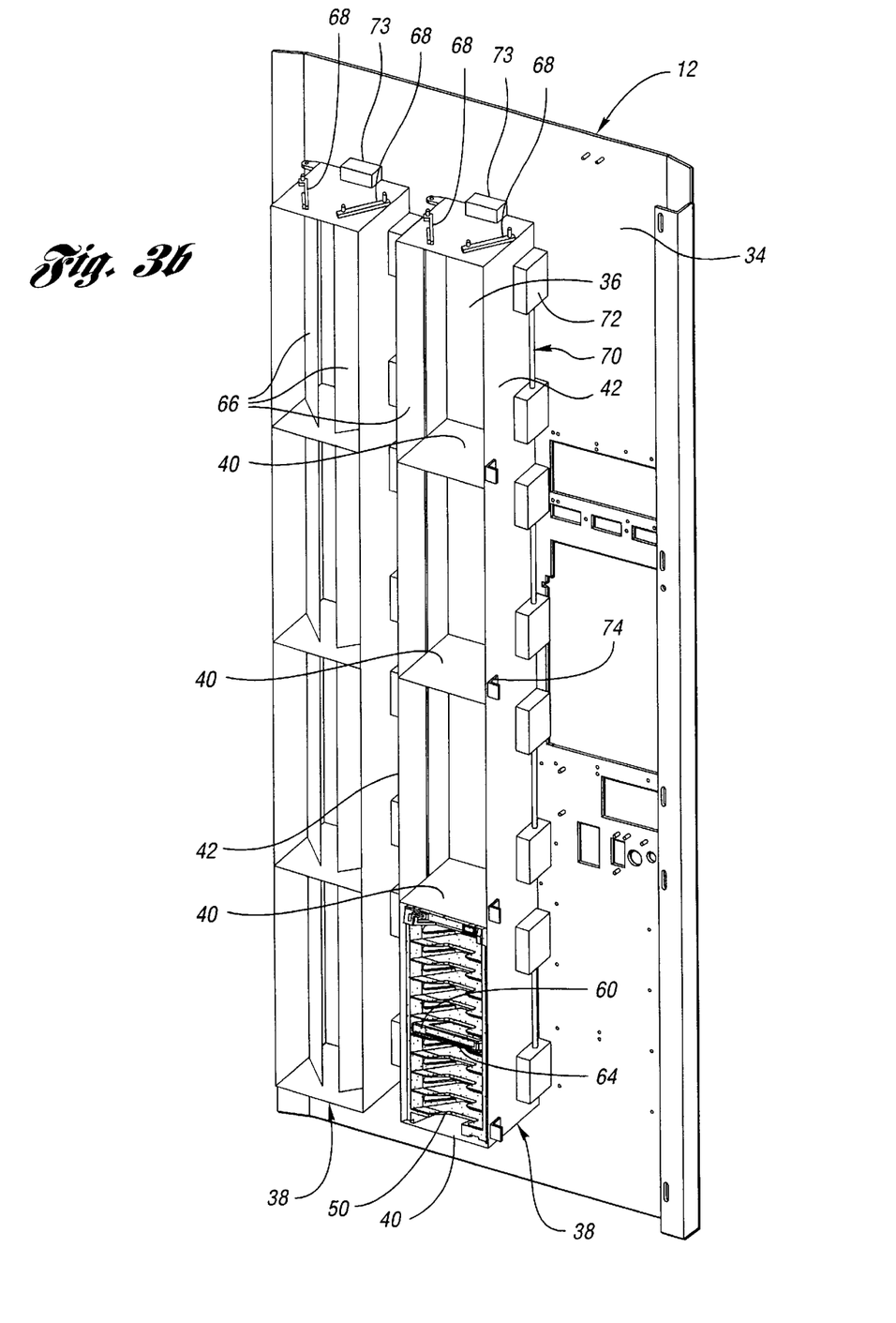
FIG. 3B illustrates a rear perspective view of the tape cartridge access port.

Referring now to FIGS. 3A and 3B, frontal and rear perspective views of tape cartridge access port 12 are shown. Enclosure panel 20 includes an exterior side 32 and an interior side 34. Exterior side 32 is external to automated cartridge library 10 and interior side 34 is internal to the automated cartridge library when enclosure panel 20 is attached to the automated cartridge library. In FIG. 3A, door panel 22a is in the closed position and lock 24 is locked. In FIG. 3A, door panel 22b is in the opened position and lock 24 is unlocked.

Tape cartridge access port 12 includes a pair of openings 36 formed by wall portions of enclosure panel 20. Openings 36 are covered by door panels 22 when the door panels are in the closed position. Openings 36 provide access for tape cartridge magazines to pass between automated cartridge library 10 and the external environment. Openings 36 have a sufficient width to allow a tape cartridge magazine to pass through to load and unload the tape cartridge magazine into and from automated cartridge library 10. Openings 36 also have a sufficient length to allow multiple tape cartridge magazines to pass through simultaneously along different parts of its length.

Tape cartridge access port 12 further includes frames 38 attached to interior side 34 of enclosure panel 20. Each frame 38 is a column including a series of laterally extending shelves 40 attached between two longitudinally extending side portions 42. Shelves 40 and side portions 42 define a series of cavities for receiving and holding tape cartridge magazines. Frames 38 are positioned around openings 36 to load and unload tape cartridge magazines through the openings.

Figure 4:
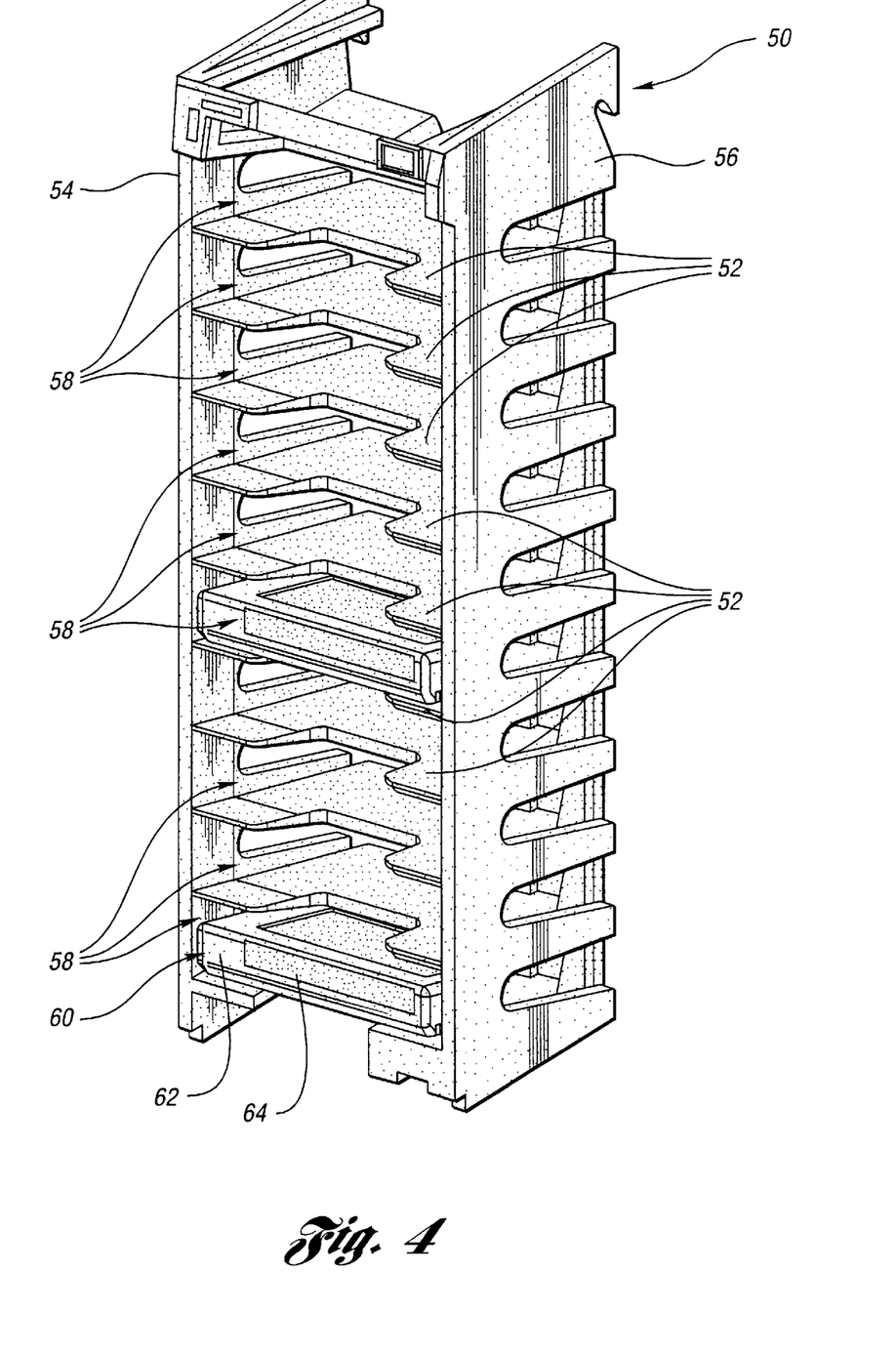
FIG. 4 illustrates a tape cartridge magazine for use with the tape cartridge access port in accordance with the present invention.

Referring now to FIG. 4, with continual reference to FIGS. 3A and 3B, a tape cartridge magazine 50 for use with tape cartridge access port 12 is shown. Tape cartridge magazine 50 includes a plurality of vertically spaced, parallel shelves 52 extending between side walls 54 and 56 to form slots 58 for holding tape cartridges such as tape cartridge 60. Tape cartridge 60 includes a front surface 62 having an information label 64 attached thereon. The width, height, and depth of slots 58 are chosen to accommodate the size of standard data storage tape cartridges. Tape cartridge 60 can only properly be inserted into a slot 58 when front surface 62 is oriented away from tape cartridge magazine 50.

Figure 5:
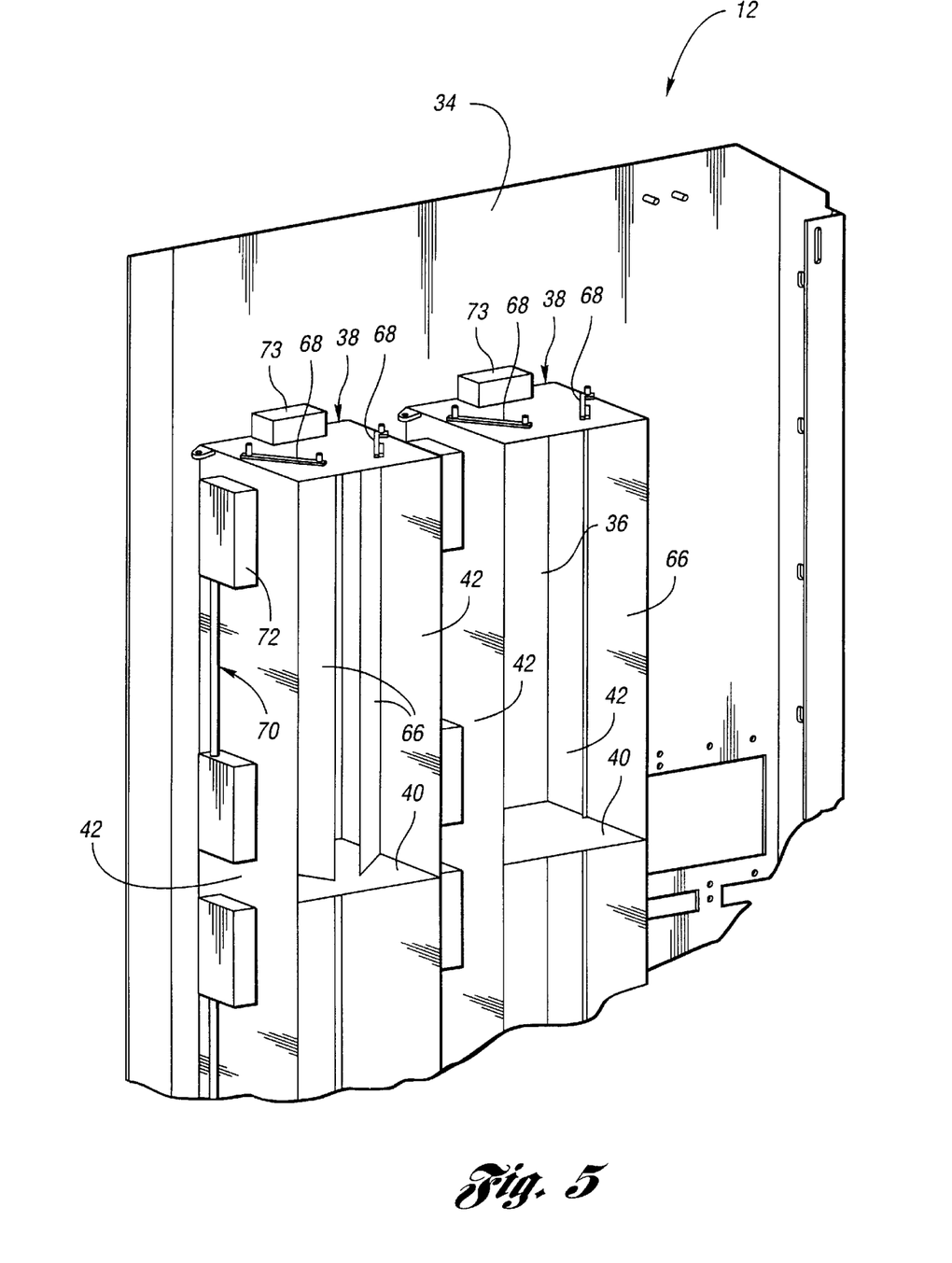
FIG. 5 illustrates in further detail the safety doors and the mechanical interlock system of the tape cartridge access port.

Referring now to FIG. 5, with continual reference to FIGS. 3A and 3B, frame 38 is filled with a tape cartridge magazine 50. Tape cartridge magazine 50 is positioned between side portions 42 of frame 38 and is supported on shelf 40. Tape cartridge magazine 50 is directly loaded through opening 36 to frame 38 such that tape cartridge 60 and information label 64 attached thereon are oriented towards the interior of automated cartridge library 10. In this orientation, tape cartridge 60 is ready for handling by robotics 28. In typical tape cartridge access ports, the tape cartridge magazine is loaded and then rotated or repositioned by a tape cartridge access port mechanism such that the tape cartridges are oriented towards the interior of the automated cartridge library after the rotation or repositioning.

Tape cartridge access port 12 further includes a hinged pair of safety doors 66 for each opening 36 and associated frame 38. Safety doors 66 are movable to an opened position to allow access through opening 36 between the internal side of automated cartridge library 10 and the external side thereof. Safety doors 66 are also movable to a closed position to prevent access through opening 36 between the internal side of automated cartridge library 10 and the external side thereof. Each pair of safety doors 66 are mechanically controlled by a respective spring loaded actuator 68. Spring loaded actuators 68 bias safety doors 66 to the closed position.

To move safety doors 66 to the opened position, tape cartridge access port 12 includes a mechanical interlock system 70. Mechanical interlock system 70 includes several interconnected latches 72 located along safety doors 66. Mechanical interlock system 70 is operable to be activated by a tape cartridge magazine being inserted through opening 36 to move safety doors 66 to the opened position. All of latches 72 must be released simultaneously to allow safety doors 66 to open. Latches 72 are located at several locations such that it would be difficult for an operator to release all of the latches simultaneously on any one safety door using his hands. Latches 72 are located such that they are released simultaneously by a tape cartridge magazine being loaded from the external environment through opening 36.

As soon as the tape cartridge magazine moves into place unlocking safety doors 66 and pushing them open, opening 36 is blocked by the tape cartridge magazine thus preventing intrusion into automated cartridge library 10 by the operator. On removal of a tape cartridge magazine, safety doors 66 are spring loaded closed by spring loaded actuator 68 and move to the closed position. Mechanical interlock system 70 latches safety doors 66 in the closed position as soon as t he tape cartridge magazine clears the safety doors. Thus, at all times, either safety doors 66 or a tape cartridge magazine prevent access of an operator to robotics 28 of automated cartridge library 10.

Tape cartridge access port 12 further includes a door panel sensor 73 associated with each door panel 22. Each door panel sensor 73 provides an opened door panel signal indicative of the respective door panel 22 being in the opened position to LMU 26. Upon receiving the opened door panel signal, LMU 26 prevents robotics 28 from manipulating a tape cartridge in a magazine held by the frame associated with the opened door panel. LMU 26 prevents robotics 28 from handling the tape cartridge in this situation because the operator has access cartridge and, in general, to ensure that the operator does not have access to the robotics.

Door panel sensor 73 also provides a closed door panel sensor signal indicative of the respective door panel 22 being in the closed position to LMU 26. Upon receiving the closed door panel sensor signal, LMU 26 allows robotics 28 to handle a tape cartridge magazine held by the frame associated with the closed door panel. LMU 26 allows robotics 28 to handle the tape cartridge in this situation because the operator does not have access to the tape cartridge. LMU 26 also controls lock 24 to lock door panel 22 in the closed position upon receiving the closed door panel sensor signal.

Tape cartridge access port 12 further includes a frame sensor 74 associated with each tape cartridge magazine cavity of frame 36. Frame sensor 74 provides information to LMU 26 regarding the lateral and vertical position of a tape cartridge magazine held by the frame. Upon receiving an indication from frame sensor 74 that the tape cartridge magazine is properly seated in frame 36, and that door panel 22 is closed, as indicated by door panel sensor 73, LMU 26 allow robotics 28 to handle the tape cartridge magazine.

Thus it is apparent that there has been provided, in accordance with the present invention, a tape cartridge access port for an automated cartridge library that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An automated cartridge library comprising:

robotics for handling a tape cartridge carried by a magazine; and a tape cartridge access port for loading a magazine filled with at least one tape cartridge for presenting the magazine and the at least one tape cartridge to the robotics, the at least one tape cartridge having a front surface with an information label, the tape cartridge access port including an enclosure panel having exterior and interior sides, an opening formed in the enclosure panel, and a frame attached to the interior side of the enclosure panel for holding the magazine filled with the at least one tape cartridge such that the information label of the at least one tape cartridge is oriented towards the robotics, wherein the tape cartridge access point further includes a hinged pair of safety doors associated with the frame, the hinged pair of safety doors are operable to open when a magazine is inserted through the opening to load the magazine into the frame while preventing access of an operator to the robotics of the automated cartridge library, wherein the tape cartridge access point further includes a mechanical interlock system associated with the frame, the mechanical interlock system having a plurality of interconnected latches positioned along the frame, wherein the latches are operable with the safety doors such that the latches must be released simultaneously to allow the safety doors to open, wherein the latches are further operable to be released simultaneously by a magazine inserted through the opening.

2. The automated cartridge library of claim 1 wherein:

the hinged pair of safety doors are operable to close when a magazine is unloaded from the frame to prevent access of an operator to the robotics.

3. The automated cartridge library of claim 2 wherein:

the safety doors are spring biased to a closed position.

4. The automated cartridge library of claim 1 wherein:

the tape cartridge access port includes a door panel attached to the exterior side of the enclosure panel, the door panel being movable between a closed position in which access to the opening by an operator is prevented and an opened position in which access to the opening by the operator is allowed, the tape cartridge access port further including a lock associated with the door panel, and a processor associated with the lock, wherein the processor controls the lock to lock the door panel in the closed position to prevent the operator and the robotics from simultaneously handling a magazine held by the frame.

5. The automated cartridge library of claim 4 wherein:

the tape cartridge access port further includes a door panel sensor for providing an opened door panel sensor signal indicative of the door panel being in the opened position to the processor, wherein upon receiving the opened door panel sensor signal the processor prevents the robotics from handling a magazine held by the frame.

6. The automated cartridge library of claim 4 wherein:

the tape cartridge access port further includes a door panel sensor for providing a closed door panel sensor signal indicative of the door panel being in the closed position to the processor, wherein upon receiving the closed door panel sensor signal the processor allows the robotics to handle a magazine held by the frame.

7. The automated cartridge library of claim 1 further comprising:

a frame sensor for providing a frame signal indicative of a magazine being held by the frame; and a processor operable with the frame sensor signal for receiving the frame signal, wherein the processor upon receiving the frame sensor signal allows the robotics to handle the magazine held by the frame.

8. A tape cartridge access port for loading and unloading a magazine filled with at least one tape cartridge into and from an automated cartridge library having robotics for handling the at least one tape cartridge, the at least one tape cartridge having a front surface with an information label, the tape cartridge access port comprising:

an enclosure panel attachable to an automated cartridge library, the enclosure panel having an exterior side exterior to the automated cartridge library and an interior side internal to the automated cartridge library;

an opening formed in the enclosure panel for enabling a magazine to pass between the exterior and interior sides of the enclosure panel;

a frame attached to the interior side of the enclosure panel for holding a magazine filled with at least one tape cartridge such that the information label of the at least one tape cartridge is oriented towards the robotics of the automated cartridge library, the frame positioned around a part of the opening to load and unload a magazine through the opening;

a hinged pair of safety doors associated with the frame, wherein the hinged pair of safety doors are operable to open when a magazine is inserted through the opening to load the magazine into the frame while preventing access of an operator to the robotics of the automated cartridge library; and a mechanical interlock system associated with the frame, the mechanical interlock system having a plurality of interconnected latches positioned along the frame, wherein the latches are operable with the safety doors such that the latches must be released simultaneously to allow the safety doors to open, wherein the latches are further operable to be released simultaneously by a magazine inserted through opening.

9. The tape cartridge access port of claim 8 wherein:

the hinged pair of safety doors are operable to close when a magazine is unloaded through the opening from the frame to prevent access of the operator to the robotics, wherein the safety doors are spring biased to a closed position.

10. The tape cartridge access port of claim 8 further comprising:

a door panel attached to the exterior side of the enclosure panel, the door panel being movable between a closed position in which access to the opening by the operator is prevented and an opened position in which access to the opening by the operator is allowed;

a lock associated with the door panel; and a processor associated with the lock, wherein the processor controls the lock to lock the door panel in the closed position to prevent the operator and the robotics from simultaneously handling a magazine held by the frame.

11. The tape cartridge access port of claim 10 further comprising:

a door panel sensor for providing an opened door panel sensor signal indicative of the door panel being in the opened position to the processor, wherein upon receiving the opened door panel sensor signal the processor prevents the robotics from handling a magazine held by the frame.

12. The tape cartridge access port of claim 10 further comprising:

a door panel sensor for providing a closed door panel sensor signal indicative of the door panel being in the closed position to the processor, wherein upon receiving the closed door panel sensor signal the processor allows the robotics to handle a magazine held by the frame.

13. The tape cartridge access port of claim 8 further comprising:

a frame sensor for providing a frame signal indicative of a magazine being held by the frame; and a processor operable with the frame sensor signal for receiving the frame signal, wherein the processor upon receiving the frame sensor signal allows the robotics to handle the magazine held by the frame.

14. A tape cartridge access port for loading and unloading a magazine filled with at least one tape cartridge into and from an automated cartridge library having robotics for handling the at least one tape cartridge, the at least one tape cartridge having a front surface with an information label, the tape cartridge access port comprising:

an enclosure panel attachable to an automated cartridge library, the enclosure panel having an exterior side exterior to the automated cartridge library and an interior side internal to the automated cartridge library;

an opening formed in the enclosure panel for enabling a magazine to pass between the exterior and interior sides of the enclosure panel;

a frame attached to the interior side of the enclosure panel for holding a magazine filled with at least one tape cartridge such that the information label of the at least one tape cartridge is oriented towards the robotics of the automated cartridge library, the frame positioned around a part of the opening to load and unload a magazine through the opening;

a hinged pair of safety doors associated with the frame, wherein the hinged pair of safety doors are operable to open when a magazine is inserted through the opening to load the magazine into the frame and to close when a magazine is unloaded from the frame while preventing access of an operator to the robotics of the automated cartridge library, wherein the hinged pair of safety doors are spring biased to a closed position;

a mechanical interlock system associated with the frame, the mechanical interlock system having a plurality of interconnected latches positioned along the frame, wherein the latches are operable with the safety doors such that the latches must be released simultaneously to allow the safety doors to open, wherein the latches are further operable to be released simultaneously by a magazine inserted through opening;

a door panel attached to the exterior side of the enclosure panel, the door panel being movable between a closed position in which access to the opening by the operator is prevented and an opened position in which access to the opening by the operator is allowed;

a lock associated with the door panel; and a processor associated with the lock, wherein the processor controls the lock to lock the door panel in the closed position to prevent the operator and the robotics from simultaneously handling a magazine held by the frame.

15. The tape cartridge access port of claim 14 further comprising:

a door panel sensor for providing an opened door panel sensor signal indicative of the door panel being in the opened position to the processor, wherein upon receiving the opened door panel sensor signal the processor prevents the robotics from handling a magazine held by the frame.

16. The tape cartridge access port of claim 14 further comprising:

a door panel sensor for providing a closed door panel sensor signal indicative of the door panel being in the closed position to the processor, wherein upon receiving the closed door panel sensor signal the processor allows the robotics to handle a magazine held by the frame.

17. The tape cartridge access port of claim 14 further comprising:

a frame sensor for providing a frame signal indicative of a magazine being held by the frame; and a processor operable with the frame sensor signal for receiving the frame signal, wherein the processor upon receiving the frame sensor signal allows the robotics to handle the magazine held by the frame.

* * * * *